United States Patent
Linnemann et al.

(10) Patent No.: US 6,933,492 B2
(45) Date of Patent: Aug. 23, 2005

(54) OPTICAL POSITION TRANSDUCER

(75) Inventors: Udo Linnemann, Traunreut (DE);
Robert Sturm, Altenmarkt (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 100 days.

(21) Appl. No.: 10/634,222

(22) Filed: Aug. 4, 2003

(65) Prior Publication Data

US 2004/0027588 A1 Feb. 12, 2004

(30) Foreign Application Priority Data

Aug. 3, 2002 (DE) ......................... 102 35 681

(51) Int. Cl.$^7$ .................................. H01J 3/14
(52) U.S. Cl. ................. 250/231.13; 250/234; 356/614; 356/616; 33/707
(58) Field of Search ................ 250/231.16, 231.13, 250/231.14, 234, 235, 236, 237 G, 239, 216; 356/614, 616, 617, 622; 33/707

(56) References Cited

U.S. PATENT DOCUMENTS 5,283,434 A 2/1994 Ishizuka et al.
5,841,133 A * 11/1998 Omi ....................... 250/231.13
6,486,467 B1 * 11/2002 Speckbacher et al. .. 250/237 G

FOREIGN PATENT DOCUMENTS

EP          0 548 848       11/1995
WO          WO 02/23131     3/2002

* cited by examiner

Primary Examiner—Kevin Pyo
(74) Attorney, Agent, or Firm—Kenyon & Kenyon

(57) ABSTRACT

An optical position transducer is arranged to determine the relative position of two objects. The position transducer includes a scale and a scanning device that is movable in relation thereto. On sides of the scanning device, signal-generating device(s) are provided for generating positionally dependent scanning signals, among which at least one is a deflector element for selectively influencing a light beam's propagation direction. Positioned on sides of the scanning device are adjustment device(s) for spatially adjusting the deflector element, the adjustment device(s) arranged to enable merely one spatial alignment of the at least one deflector element.

29 Claims, 5 Drawing Sheets

FIG. 3a
FIG. 3b
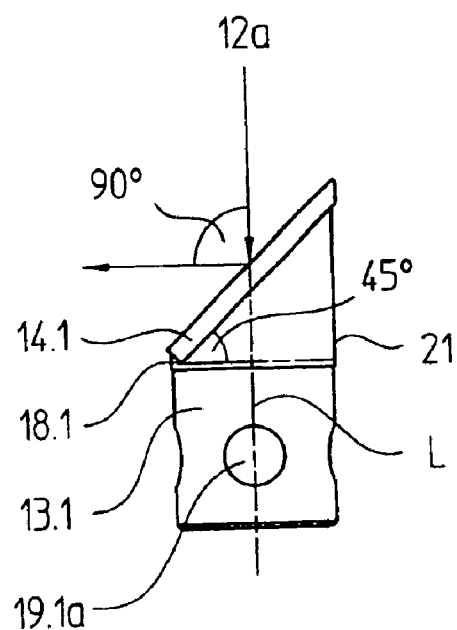
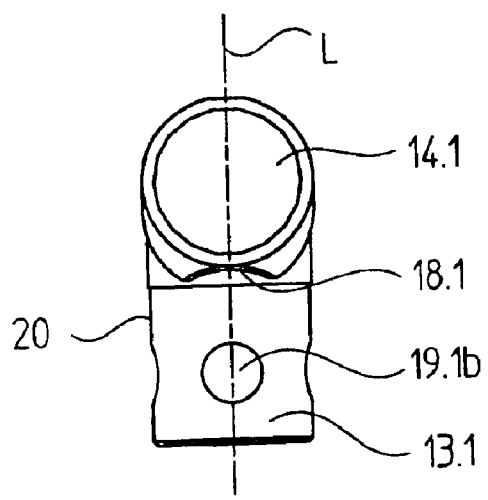
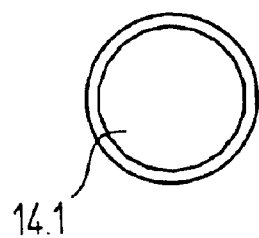

OPTICAL POSITION TRANSDUCER

CROSS-REFERENCE TO RELATED APPLICATIONS

The present application claims priority to Application No. 102 35 681.5, filed in the Federal Republic of Germany on Aug. 3, 2002, which is expressly incorporated herein in its entirety by reference thereto.

FIELD OF THE INVENTION

The present invention relates to an optical position transducer.

BACKGROUND INFORMATION

An optical position transducer is described in FIG. 4a of European Published Patent Application No. 0 548 848. It includes a scale, as well as a scanning device that is movable in relation thereto. Signal-generating means are located on the side of the scanning device to produce displacement-dependent scanning signals. The signal-generating means include, inter alia, a light source, a scanning grating, a plurality of optoelectronic detector elements, as well as a deflector element in the form of a mirror for selectively influencing a light beam's propagation direction. The light source, the detector elements, as well as the mirror are mounted together in a carrier housing, which is movably supported and is spatially adjustable via adjusting mechanisms in the form of setting screws. By way of the setting screws, the light beam deflected by the mirror in the direction of the scanning grating can thus be properly aligned in the scanning beam path with respect to the scanning grating or the scale. However, the drawback of adjusting the light beam on sides of the scanning device, as proposed, is that a relatively expensive mechanical system is required. Moreover, the proposed variant for adjusting the deflector element is not universally applicable to other scanning systems.

It is an object of the present invention to provide an optical position transducer which may enable a light beam to be precisely, spatially aligned or deflected in the scanning beam path in a flexible and simple manner.

SUMMARY

The above and other beneficial objects of the present invention may be achieved by providing an optical position transducer as described herein.

In an example embodiment of the present invention, an optical position transducer includes a scale, a scanning device movable in relation to the scale and including signal-generation devices configured to generate positionally dependent scanning signals, the signal-generation devices including at least one deflector element configured to selectively influence a light beam propagation direction arranged on sides of the scanning device, and an adjustment device configured and positioned to spatially adjust the deflector element, the adjustment device configured to enable spatial alignment of at least one deflector element independently of other signal-generating devices.

In an example embodiment of the present invention, an optical position transducer includes a scale, scanning means movable in relation to the scale and including signal-generating means for generating positionally dependent scanning signals, the signal-generating means including at least one deflecting means for selectively influencing a light beam propagation direction arranged on sides of the scanning means, and adjusting means positioned for spatially adjusting the deflecting means, the adjusting means for enabling spatially aligning at least one deflecting means independently of other signal-generating means.

Example embodiments of the optical position transducer according to the present invention are described herein.

The adjustment-device in accordance with an example embodiment of the present invention is arranged to enable at least one deflector element to be uniquely spatially aligned by itself, independently of other signal-generating devices. This may make possible a simple construction of the adjustment device, which may enable beams to be flexibly deflected in the scanning device of a position measuring transducer, in a manner that is adaptable to the spatial conditions of the particular scanning device.

Using a suitable adjusting tool, the deflector element may be able to be precisely adjusted, so that the incident light beam is deflected in the desired spatial direction. In this connection, a plurality of deflector elements or adjustment devices arranged in accordance with an example embodiment of the present invention may be provided in the scanning device, for instance for the light beams emitted by the light source, as well as for the light beams propagating in the direction of the detector elements. The light beams in question may be able to be adjusted independently of one another in relation to other optical elements in the scanning device or in relation to the scale, depending on the particular requirements of the alignment.

Other aspects of the present invention and details pertaining thereto are derived from the following description of exemplary embodiments, on the basis of the attached figures.

BRIEF DESCRIPTION OF THE DRAWINGS

FIGS. 3a and 3b illustrate details of an example embodiment of a deflector element in conjunction with an adjustment device.

DETAILED DESCRIPTION

Figure 1:
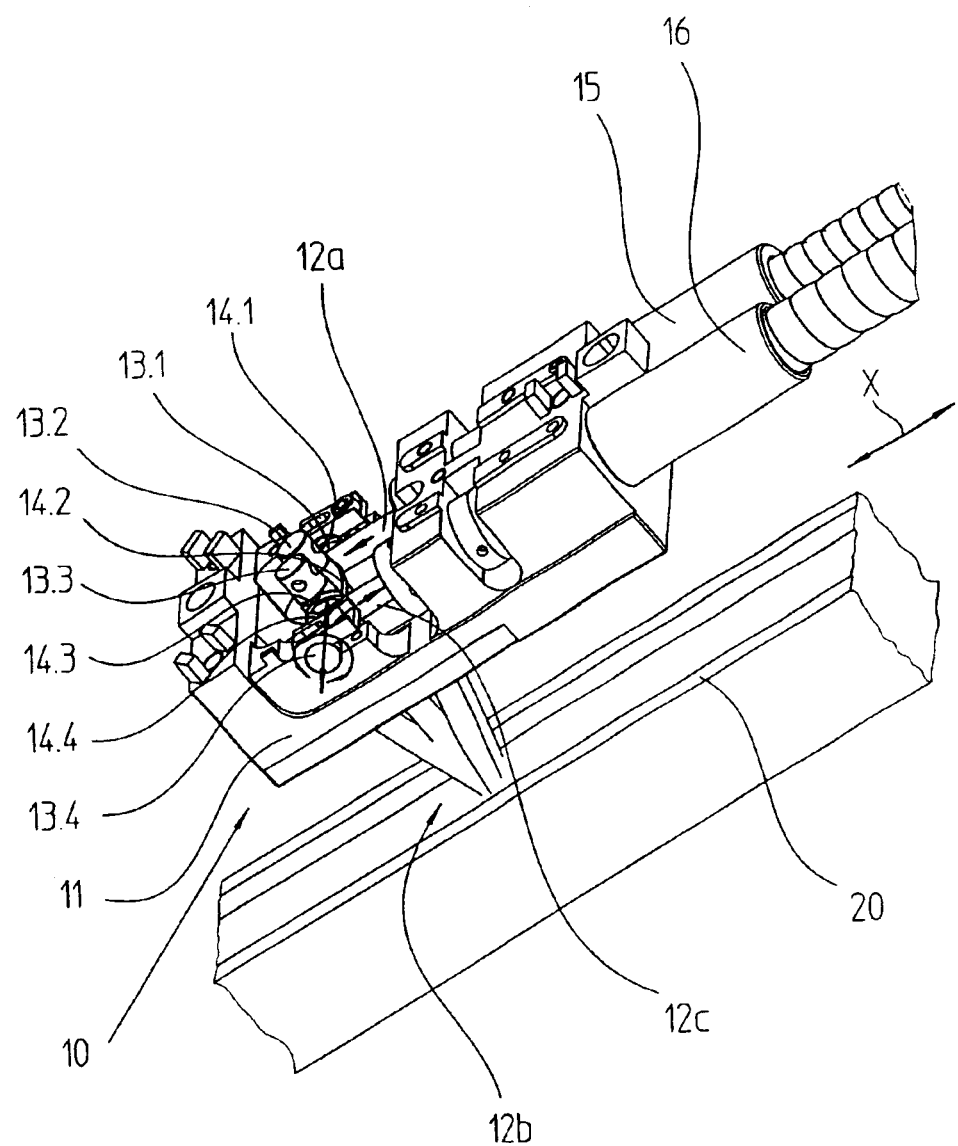
FIG. 1 is a schematic view of the scanning beam path component of an exemplary embodiment of the optical position transducer in accordance with the present invention.

In a schematic spatial representation, FIG. 1 illustrates a part of an exemplary embodiment of the optical position transducer in accordance with the present invention. The optical position transducer essentially includes a linear scale 20 having a measuring graduation, as well as a scanning device 10 that is displaceable in relation to the scale in measuring direction x. Given a relative displacement of scanning device 10 in measuring direction x, the measuring graduation of scale 20 is scanned and positionally dependent scanning signals are generated with the aid of scanning device 10 and the signal-generating device provided. The scanning signals generated in this manner are further processed in a downstream sequential electronics.

Thus, using the optical position transducer in accordance with an example embodiment of the present invention, it is possible to precisely record the relative position of two objects, which are movable relatively to one another, in measuring direction x, one of these being connected to scanning device 10, the other to scale 20. The measures elucidated in the following may also be applied to position transducers which record relative rotational movements.

In the example embodiment shown, merely one part of the various signal-generating devices, used for generating positionally dependent scanning signals, is configured in housing 11 of scanning device 10. Besides the four deflector elements (to be explained in greater detail in the following), including the adjusting device, which are used for selectively influencing the propagation direction of the various propagating beams 12a, 12b, 12c in scanning device 10, other scanning gratings and optical elements for beam guidance, etc., are also provided on sides of scanning device 10. In the present example embodiment, these include, inter alia, a retro-reflecting prism as well. Positioned outside of housing 11 of scanning device 10 is a suitable light source, the radiation of which is supplied via a light-conducting fiber 15 of scanning device 10. Also placed so as to be spatially separate from scanning device 10 is a plurality of optoelectronic detector elements. They record the displacement-dependent scanning signals. The beams to be detected are routed to these detector elements via a plurality of light-conducting fibers in a cable assembly 16.

The scanning beam path used in this exemplary embodiment shall not be discussed in greater detail here. Reference is made to International Published Patent Application No. WO 02/23131, which is expressly incorporated herein in its entirety by reference thereto. In principle, the measures explained in greater detail in the following may be applied, in conjunction with the most varied of optical scanning principles or scanning beam paths, to appropriate scanning devices.

Figure 2:
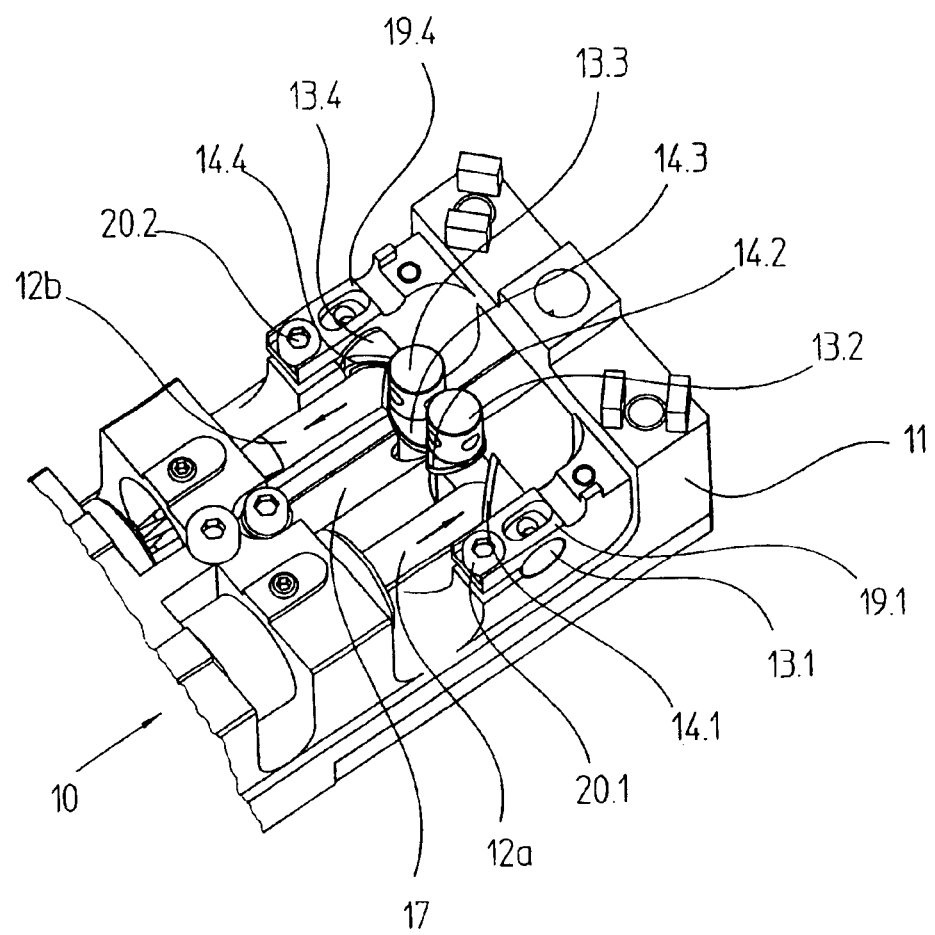
FIG. 2 is a detail view of the scanning device illustrated in FIG. 1.

To implement the desired scanning beam path in a compact scanning device 10, beams 12a, 12b, 12c propagating there may be deflected several times. In one example, two 90° deflections of the incident beam and two 90° deflections of the emergent beam are provided. In this connection, reference is additionally made to the spatial representation in FIG. 2, showing an enlarged detail of scanning device 10 of FIG. 1. As is discernible, beam 12a coming from the light source and entering into scanning device 10 undergoes a first horizontal deflection of 90° in relation to the direction of incidence at a first deflector element designed as mirror 14.1. At a second deflector element, i.e., mirror 14.2, the first deflection follows in the vertical direction by 90° in the direction of reflecting prism 17 or scale 20. Via a third mirror 14.3, the beam coming from the direction of scale 20 is vertically deflected, in turn, by 90°, subsequently impinges upon fourth mirror 14.4, and is again horizontally deflected by the same by 90° in its direction of propagation and is routed as beam 12b, as explained above, via various light-conducting fibers in cable assembly 16, to the detector elements.

In the present example embodiment, therefore, via the deflector elements arranged as mirrors 14.1 to 14.4, altogether four deflection operations of 90° each result in relation to the particular direction of incidence of the beam impinging upon mirrors 14.1 to 14.4. Depending on the scanning beam path provided, the number of deflection operations, as well as the particular deflection direction may vary in scanning devices having alternative designs.

To align the various beams 12a, 12c propagating in the scanning device in relation to the other optical components required for generating signals—for example, in the direction of reflecting prism 17—, an adjusting device arranged in accordance with the present invention is provided for mirrors 14.1 to 14.4 or deflector elements in scanning device 10. In this exemplary embodiment, the cylindrical carrier elements 13.1 to 13.4 are arranged as an adjusting device. In this connection, to further elucidate the adjusting device, reference is also made to FIGS. 3a and 3b, which each show a side view of first carrier element 13.1 in combination with first mirror 14.1. The other three systems composed of carrier elements 13.2, 13.3, 13.4 and mirrors 14.2, 14.3, 14.4, respectively, which are mounted in scanning device 10, in FIGS. 1 and 2, in principle, being substantially identical in arrangement thereto.

Carrier element 13.1 illustrated in FIGS. 3a and 3b is essentially cylindrical and is chamfered at one longitudinal end. Mirror 14.1 is mounted, e.g., adhesively, so that it may fit exactly on the chamfer. In this connection, in this example embodiment, mirror 14.1 is mounted on the chamfer with its reflecting side turned away from carrier element 13.1. To provide the 90° deflection of incident beam 12a in the present example embodiment, the chamfer may be positioned at the longitudinal end of carrier element 13.1 at an angle of 45° to a perpendicular to the cylinder jacket. Should the need arise for other deflection angles, then the chamfer angle may be modified accordingly.

As is discernible from FIGS. 3a and 3b, a stop face 18.1 in the form of a stop edge, which mirror 14.1 fits flush against, is provided on the bottom boundary or contact side of the chamfer. Stop face 18.1 facilitates the process of aligning mirror 14.1 to the chamfer of carrier element 13.1.

In the area beneath the chamfer, carrier element 13.1 has a plurality of cut-outs 19.1a, 19.1b, into which a suitable adjusting tool may engage. In the present example embodiment, the cut-outs are each traversing circular bores, which are oriented at a 90° angle to one another. Thus, there are four cut-outs of this kind over the periphery of the cylinder. Stainless steel may be used, for example, as material for carrier elements 13.1 to 13.4.

In addition, cylindrical carrier element 13.1 has another stop edge 21 which extends around the periphery of the cylinder and prevents damage to mirror 14.1 in the case of displacement of carrier element 13.1 in the direction of carrier-element longitudinal axis L.

With respect to mirrors 14.1 to 14.4, it should be mentioned that, e.g., those are used which may only cause a slight phase shift in the deflected beams. In addition, based on the given facts of the applied scanning principle, in the example embodiment it may be provided, even after the two-time deflection is accomplished, that the deflected beams retain their polarization state, i.e., in the present case, that linearly polarized light may be present even after two deflections. With respect to the mirrors used, this may mean that, to the greatest extent possible, they may have the same reflectivities, both when reflecting p-polarized light, as well as when reflecting s-polarized light, and that they may produce phase lags which may be the same as possible. From this, in turn, virtually the same penetration depths into the particular mirror surfaces may result in both cases. For that reason, dielectric mirrors may be used in the present example, which may not exhibit transmission or absorption of any significance when reflecting p-polarized light nor when reflecting s-polarized light. Alternatively, other mirrors may also be used as well, which retain the particular polarization state, such as metallic mirrors, etc. This is possible due to the double 90° deflection provided in the example embodiment.

As illustrated in FIG. 1 by the arrows assigned to mirror 14.3 or carrier element 13.3, all carrier elements 13.1 to 13.4 in housing 11 of scanning device 10 are movably supported both about as well as along the particular carrier-element longitudinal axis L. This may mean that, for adjustment purposes, a displacement of the particular carrier element 13.1 to 13.4 along carrier-element longitudinal axis L is possible on the one hand, as is a rotation about carrier-element longitudinal axis L, on the other hand. The precise final adjustment is ultimately accomplished using an appropriate adjusting tool, such as a mandrel, a thin spike, etc., which engages for this purpose in the above-mentioned cut-outs of the particular carrier element 13.1 to 13.4. Thus, by applying the foregoing measures of the example embodiment of the present invention, it is possible to uniquely spatially adjust just the mirrors 14.1 to 14.4 by themselves, i.e., without having to reposition, i.e., change the spatial position of other signal-generating devices on sides of scanning device 10.

For clarity, the mentioned arrows which illustrate the movable mounting arrangement about or along carrier-element longitudinal axis L, are depicted in FIG. 1 only in conjunction with carrier element 13.3. In the present example embodiment, all carrier elements 13.1 to 13.4 may feature a movable mounting arrangement of this kind in housing 11 of scanning device 10.

As is apparent from FIG. 2, the two carrier elements 13.1, 13.4 rest in semicircular recesses of housing 11 of scanning device 10 and may be moved in these recesses both about and along the particular carrier-element longitudinal axis L. Once the adjustment is made, carrier elements 13.1, 13.4 are held in place in the desired spatial position using suitable arresting-type holding elements. This may be accomplished in the present example embodiment by a peripheral clamping using a counterpiece 19.1, 19.4, which is positioned above carrier element 13.3, 13.4 on housing 10 and is formed by a slotted mounting point in the housing and is able to be fixed by a screw 20.2.

The two other carrier elements 13.2, 13.3 are also able to be fixed in the desired position using suitable holding elements. A variety of clamping mechanisms are possible as holding elements in this case.

Figure 4:
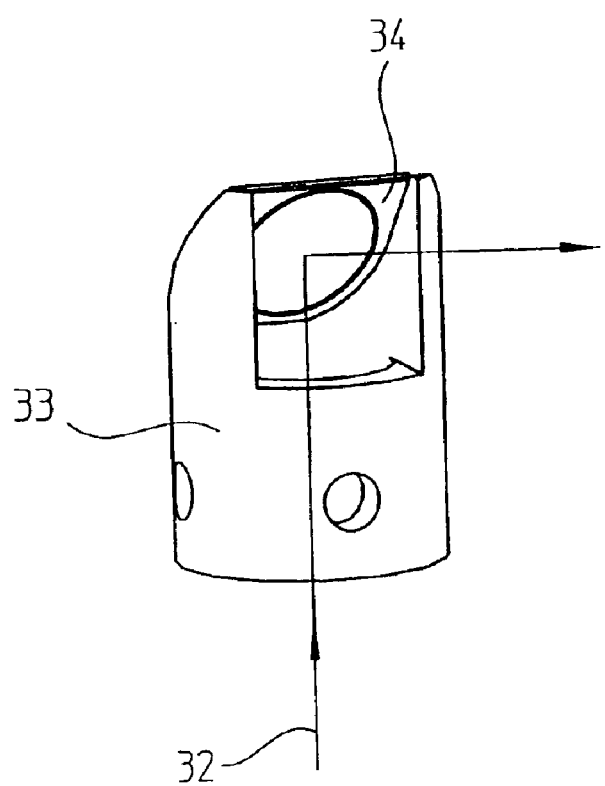
FIG. 4 is a spatial representation of another example embodiment of a deflector element in conjunction with an adjustment device.

An alternative example embodiment of the carrier element, on which the deflector element, respectively the mirror, is mounted is explained on the basis of FIG. 4, merely the differences from the above variant being discussed. At this point, a carrier element 33 is provided in this example embodiment which is cylindrical but is arranged to be hollow on the inside or is designed as a cylindrical hollow part. Consequently, the path of beam 32 to be deflected extends inside the cylindrical hollow part. In accordance with this variant, mirror 34 required for beam deflection may be oriented with its reflecting side in the direction of the cylindrical cavity. With regard to the further example embodiment of carrier element 33, reference is made to the above explanations.

Figure 5:
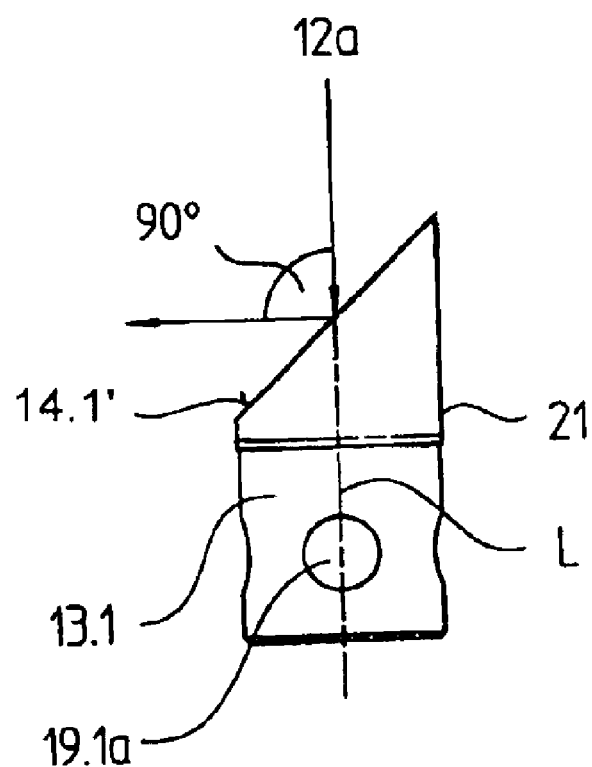
FIG. 5 illustratedetails of an example embodiment of a deflector element in conjunction with an adjustment device.

In another exemplary embodiment of the present invention, as illustrated in FIG. 5, the particular deflector element 14.1' may be integrated in the movably supported carrier element 13.1, so that one surface of the carrier element 13.1 is arranged as a deflector element, and the movably supported carrier element 13.1 is arranged as an adjusting device. To this end, analogously to the above example embodiment, the carrier element 13.1 may be cylindrical and, on at least one longitudinal end, may have a chamfer which is arranged directly as a deflector element 14.1'. For example, in this case, the carrier element 13.1 may be made of glass and the chamfer suitably polished or heat-treated in order to ensure sufficient reflectivity. Alternatively, a suitable metal having adequate reflective properties may also be provided.

In another example embodiment, the carrier element has an alternative cut-out in which a suitable adjusting tool engages for precise alignment purposes. Thus, for instance, on the bottom side of the carrier element, a conical counterbore having an internal thread may be provided on the inside of the carrier element in which an adjusting tool having a corresponding counter-cone is fixed. Thus, the adjusting tool engages in the projection of the rotational axis or of the longitudinal axis of the carrier element and not perpendicularly to the rotational axis, as in the above example embodiment.

Besides the above-described example embodiments, there are other possible alternative embodiments within the scope of the present invention.

What is claimed is:

1. An optical position transducer, comprising:
   a scale;
   a scanning device movable in relation to the scale and including signal-generation devices configured to generate positionally dependent scanning signals, the signal-generation devices including at least one deflector element configured to selectively influence a light beam propagation direction arranged on sides of the scanning device; and
   an adjustment device configured and positioned to spatially adjust the deflector element, the adjustment device configured to enable only spatial alignment of at least one deflector element independently of any other signal-generating component arranged in the scanning device.

2. The position transducer according to claim 1, wherein the adjustment device includes a movably supported carrier element, and wherein the deflector element includes a mirror and is mounted on the movably supported carrier element.

3. The position transducer according to claim 2, wherein the carrier element is cylindrical, the mirror positioned on a chamfer on at least one longitudinal end of the carrier element.

4. The position transducer according to claim 3, wherein the chamfer includes a stop face at one boundary side adapted to engage the mirror.

5. The position transducer according to claim 3, wherein the carrier element is movably supported in the scanning device about a longitudinal axis of the carrier element.

6. The position transducer according to claim 3, wherein the carrier element is movably supported in the scanning device along a longitudinal axis of the carrier element.

7. The position transducer according to claim 3, wherein the carrier element includes at least one cut-out adapted to engage an adjusting tool.

8. The position transducer according to claim 3, wherein the mirror is adhesively mounted on the chamfer.

9. The position transducer according to claim 3, wherein the mirror is mounted on the chamfer with a reflective side oriented away from the carrier element.

10. The position transducer according to claim 3, wherein the carrier element is hollow and the mirror is oriented with a reflective side in a direction of a cylindrical cavity on the chamfer.

11. The position transducer according to claim 5, further comprising holding elements assigned to the carrier element adapted to fix the movably supported carrier element in a specific position.

12. The position transducer according to claim 6, further comprising holding elements assigned to the carrier element adapted to fix the movably supported carrier element in a specific position.

13. The position transducer according to claim 1, wherein the adjustment device includes a movably supported carrier element, the deflector element integrated in the movably supported carrier element and including a surface of the carrier element.

14. The position transducer according to claim 13, wherein the carrier element is cylindrical and includes a chamfer on at least one longitudinal end arranged as the deflector element.

15. An optical position transducer, comprising:

a scale;

scanning means movable in relation to the scale and including signal-generating means for generating positionally dependent scanning signals, the signal-generating means including at least one deflecting means for selectively influencing a light beam propagation direction arranged on sides of the scanning means; and adjusting means positioned for spatially adjusting the deflecting means, the adjusting means for enabling only spatially aligning at least one deflecting means independently of any other signal-generating means arranged in the scanning means.

16. The position transducer according to claim 1, wherein the carrier element is rotatable about a longitudinal axis of the carrier element.

17. An optical position transducer, comprising:

a scale;

a scanning device movable in relation to the scale and including signal-generation devices configured to generate positionally dependent scanning signals, the signal-generation devices including at least one deflector element configured to selectively influence a light beam propagation direction arranged on sides of the scanning device; and an adjustment device configured and positioned to spatially adjust the deflector element, the adjustment device configured to enable only spatial alignment of at least one deflector element independently of any other signal-generating component arranged in the scanning device;

wherein the adjustment device includes a movably supported carrier element, the deflector element including a mirror and being mounted on the movably supported carrier element, the carrier element being cylindrical, the mirror being positioned on a chamfer on at least one longitudinal end of the carrier element, the carrier element being rotatable about a longitudinal axis of the carrier element.

18. The position transducer according to claim 17, wherein the chamfer includes a stop face at one boundary side adapted to engage the mirror.

19. The position transducer according to claim 17, wherein the carrier element is movably supported in the scanning device about a longitudinal axis of the carrier element.

20. The position transducer according to claim 17, wherein the carrier element is movably supported in the scanning device along a longitudinal axis of the carrier element.

21. The position transducer according to claim 17, wherein the carrier element includes at least one cut-out adapted to engage an adjusting tool.

22. The position transducer according to claim 17, wherein the mirror is adhesively mounted on the chamfer.

23. The position transducer according to claim 17, wherein the mirror is mounted on the chamfer with a reflective side oriented away from the carrier element.

24. The position transducer according to claim 17, wherein the carrier element is hollow and the mirror is oriented with a reflective side in a direction of a cylindrical cavity on the chamfer.

25. The position transducer according to claim 19, further comprising holding elements assigned to the carrier element adapted to fix the movably supported carrier element in a specific position.

26. The position transducer according to claim 20, further comprising holding elements assigned to the carrier element adapted to fix the movably supported carrier element in a specific position.

27. The position transducer according to claim 17, wherein the adjustment device includes a movably supported carrier element, the deflector element integrated in the movably supported carrier element and including a surface of the carrier element.

28. The position transducer according to claim 27, wherein the carrier element is cylindrical and includes a chamfer on at least one longitudinal end arranged as the deflector element.

29. An optical position transducer, comprising:

a scale;

a scanning device movable in relation to the scale and including signal-generation devices configured to generate positionally dependent scanning signals, the signal-generation devices including at least one deflector element configured to selectively influence a light beam propagation direction arranged on sides of the scanning device; and an adjustment device configured and positioned to spatially adjust the deflector element, the adjustment device configured to enable spatial alignment of at least one deflector element independently of other signal-generating devices and independently of a light source of the light beam.

* * * * *